(No Model.)
J. R. BAILEY.
CHISEL.
No. 376,276. Patented Jan. 10, 1888.
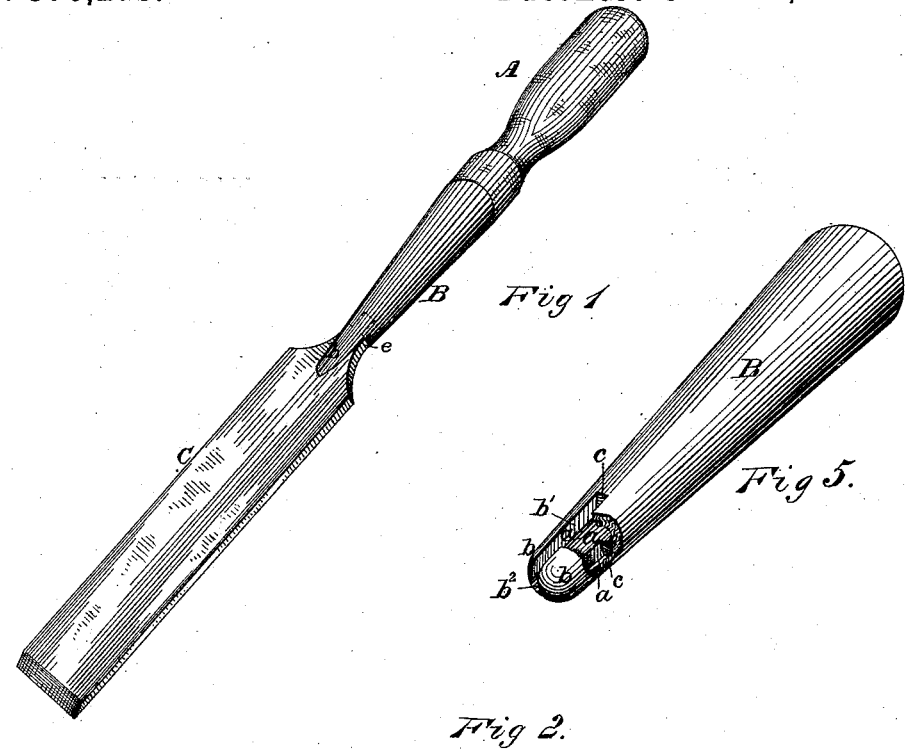
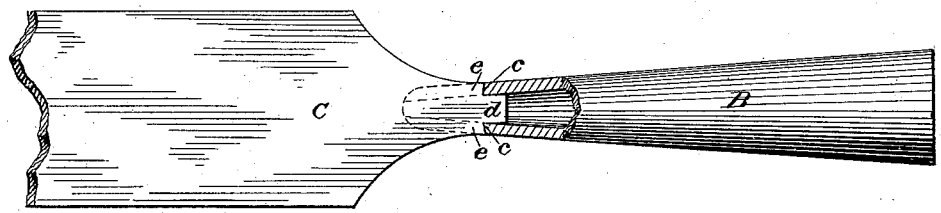
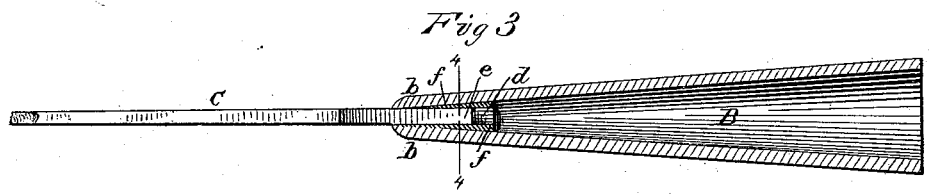
WITNESSES:
INVENTOR:

UNITED STATES PATENT OFFICE.

JOSEPH R. BAILEY, OF BROOKLYN, NEW YORK.

CHISEL.

SPECIFICATION forming part of Letters Patent No. 376,276, dated January 10, 1888.

Application filed June 28, 1887. Serial No. 242,792. (No model.)

*To all whom it may concern:*

Be it known that I, JOSEPH R. BAILEY, a citizen of the United States, residing at Brooklyn, in the county of Kings and State of New York, have invented certain new and useful Improvements in Chisels, of which the following is a specification.

This invention relates to chisels, gouges, or similar tools in which the handle-socket and blade are composed of separate pieces of metal united by brazing or soldering.

In chisels having socket-shanks as ordinarily constructed the blade is usually welded to the socket, in which case a comparatively coarse grade of steel is necessarily employed, and the blade requires tempering or retempering after the welding operation, in which case it cannot be tempered evenly.

The object of this invention is to provide a chisel or gouge which can be made sufficiently strong without welding, and in which the finest quality of properly-tempered steel may be employed.

In the accompanying drawings, Figure 1 is a perspective view of this improved chisel. Fig. 2 is a side view, partly in section. Fig. 3 is an edge view, the shank being in section and the blade in full lines. Fig. 4 is a transverse section on line 4 4 of Fig. 3. Fig. 5 is a perspective view, partly broken away, of the handle-socket before it is united with the blade.

Similar letters of reference indicate corresponding parts in the different figures.

This improved chisel comprises a handle, A, a tubular socket, B, and a blade, C.

The handle A is constructed of wood or other suitable material in the usual shape.

The socket B is a hollow tapered metallic tube, which may be constructed in any known manner of malleable iron or other metal. At its smaller end it is provided on opposite sides with longitudinal rectangular slots $a\, a$, which form two downwardly-projecting fixed jaws, $b\, b$, opposite each other and adjacent to the slots. The edges $c\, c$ of the metal at the upper ends of the slots are preferably beveled. Each of the fixed jaws has flat inner faces, $b'\, b'$, and a concave inner face, $b^2$, between said flat faces.

The blade C is provided at its upper end with a short tongue, $d$, adapted to fit into the socket B above the slots $a\, a$, and with shoulders $e\, e$, which are preferably inclined to fit against the beveled edges $c\, c$ at the upper ends of said slots. This beveling of the edges and inclining of the shoulders increases the strength of the joint. This blade C is cut or stamped out from plate-steel previously rolled to the required thickness and taper, and is hardened and tempered in the usual way before being united with the socket. It can thus be evenly tempered, and the temper is not impaired by the brazing or soldering operation used instead of welding to attach it to the socket.

In uniting the blade and the socket the shank of the blade is passed between the fixed jaws $b\, b$ of the socket until the tongue $d$ is projected into the socket above the slots $a$ and the shoulders $e$ rest against the edges $c$ at the upper ends of said slots. The parts are then united by brazing or soldering, the solder or brazing metal $f$ filling the concave faces $b^2$ of the fixed jaws $b$ in contact with the blade and producing a strong joint.

Owing to the separate construction of the blade and socket the tool may be cheaply produced, and the tongue and shoulders of the blade fitting the socket and the downwardly-projecting jaws of the socket brazed or soldered to the blade constitute a thoroughly braced and strong joint, which answers the purpose of an integral union by welding. Moreover, the socket can be made longer than the welded sockets without increasing the difficulty of securing an evenly-tempered blade.

This invention is applicable to chisels, gouges, or other similar tools, and the use of the term "chisel" herein is to be understood as carrying its equivalents.

I claim—

1. A chisel comprising a tubular socket provided with slots and fixed jaws at its lower end, and a steel blade the upper end of which is fitted between said jaws, and provided with a tongue fitting into the lower end of said socket, and with shoulders on opposite sides of said tongue fitting against the upper edges of said slots, the said parts being soldered or brazed together, substantially as described.

2. A chisel comprising a tubular socket provided with slots and fixed jaws at its lower end, said jaws having concave inner faces, and a steel blade the upper end of which is fitted between said fixed jaws, and provided with a tongue fitted into the lower end of said socket above said slots, and shoulders on opposite sides of said tongue fitting against the upper edges of said slots, the said parts being soldered or brazed together, substantially as described.

3. A chisel comprising a tubular socket provided at its lower end with slots having beveled upper edges and with fixed jaws, and a steel blade the upper end of which is fitted between said fixed jaws, and provided with a tongue fitting into the lower end of said socket above said slots, and with inclined shoulders on opposite sides of said tongue fitting against the beveled upper edges of said slots, the said parts being soldered or brazed together, substantially as described.

4. A chisel comprising a tubular socket provided at its lower end with slots having beveled upper edges and with fixed jaws having concave inner faces, and a steel blade the upper end of which is fitted between said fixed jaws, and provided with a tongue fitting into the lower end of said socket above said slots, and with inclined shoulders on opposite sides of said tongue fitting against the beveled upper edges of said slots, said parts being soldered or brazed together, substantially as described.

JOSEPH R. BAILEY.

Witnesses:
A. C. FEREEMAN,
W. G. C. CLARK.